US00RE37620E

(19) United States
(12) Reissued Patent
Nuber et al.

(10) Patent Number: US RE37,620 E
(45) Date of Reissued Patent: Apr. 2, 2002

(54) BANDWIDTH EFFICIENT COMMUNICATION OF USER DATA IN DIGITAL TELEVISION DATA STREAM

(75) Inventors: Ray Nuber, Rancho Palos Verdi; Paul Moroney, Olivehain; Chris Hoogenboom, Oxnard, all of CA (US)

(73) Assignee: General Instrument Corporation, Horsham, PA (US)

(21) Appl. No.: 09/464,249

(22) Filed: Dec. 16, 1999

Related U.S. Patent Documents

Reissue of:
(64) Patent No.: 5,699,124
Issued: Dec. 16, 1997
Appl. No.: 08/495,369
Filed: Jun. 28, 1995

(51) Int. Cl.[7] ..... H04N 7/025; H04N 7/087
(52) U.S. Cl. ..... 348/465; 348/467; 348/478; 375/240.26
(58) Field of Search ..... 348/465, 467, 348/468, 461, 478, 426.1, 432.1, 427.1; 375/240.26, 242.27; 380/210, 212

(56) References Cited

U.S. PATENT DOCUMENTS 5,289,276 A * 2/1994 Siracusa et al. ..... 348/467
5,400,401 A * 3/1995 Wasilewski et al. ..... 380/9
5,517,250 A 5/1996 Hoogenboom et al.
5,519,780 A * 5/1996 Woo et al. ..... 380/49
5,526,427 A * 6/1996 Thomas et al. ..... 380/20

OTHER PUBLICATIONS

"MPEG–2/DCII Video Decompression Processor," Preliminary Data Sheet, Motorola Microprocessor and Memory Technologies Group, MC68VDP, Motorola, 1994.

* cited by examiner

*Primary Examiner*—Victor R. Kostak
(74) *Attorney, Agent, or Firm*—Barry R. Lipsitz

(57) ABSTRACT

A method and apparatus are provided for communicating VBI user information for digital television. A syntax is provided which allows the transport of closed captions, non-realtime video, sampled video and AMOL. Non-realtime video can be used to transport various types of data, such as a vertical interval test signal (VITS) through the system at full resolution. The provision in the syntax of a count for each type of VBI user information enables the adjustment of a digital television data stream to accommodate variable amounts and types of such information without space being reserved in advance. The provision of a priority number in the syntax enables decoders to discard VBI user information priorities which are not supported by the particular decoder.

46 Claims, 4 Drawing Sheets

BANDWIDTH EFFICIENT COMMUNICATION OF USER DATA IN DIGITAL TELEVISION DATA STREAM

Matter enclosed in heavy brackets [ ] appears in the original patent but forms no part of this reissue specification; matter printed in italics indicates the additions made by reissue.

BACKGROUND OF THE INVENTION

The present invention relates to the communication of digital television signals, and more particularly to a bandwidth efficient scheme for providing user data in a digital television data stream without the need to reserve space for the user data in advance. Examples of such user data include closed caption data, non-realtime video data (e.g., vertical interval test signal—VITS), sampled video data and automated measurement of lineup (AMOL) data.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

One way to transmit the compressed video data to a receiver is in the form of packets contained within a packetized data stream. Typically, packets carrying compressed video data are multiplexed with other packets, e.g., carrying corresponding audio data and control information necessary to reconstruct a television signal. One standard for transporting digital television signals in this manner is the MPEG-2 standard, details of which can be found in the International Organisation for Standardisation, ISO/IEC 13818-1, International Standard, 13 Nov. 1994 entitled "Generic Coding of Moving Pictures and Associated Audio: Systems," recommendation H.222.0, incorporated herein by reference. Further details of the video syntax and semantics for MPEG-2 video can be found in International Organisation for Standardisation, ISO/IEC 13818-2, International Standard, 1995 entitled "Generic Coding of Moving Pictures and Associated Audio: Video," recommendation H.262, also incorporated herein by reference.

In the MPEG-2 system (and the similar DigiCipher® II system proprietary to General Instrument Corporation, the assignee hereof) a transport stream, or transport multiplex is made up of a contiguous set of fixed length packets. The video sequence is transported using a hierarchical structure in which a sequence header is followed by various extensions, user data, a group of pictures ("GOP") header, optional user data, a picture header, etc. The sequence header provides information for a sequence of pictures, which in general will include more than one GOP. This information includes, for example, horizontal and vertical size values, aspect ratio, frame and bit rate, and quantization parameters for the video data. A user data extension can also be included which, among other things, provides additional data for use by decoders. The DigiCipher® II standard provides for the transport of additional user data after the sequence header, in order to identify a DigiCipher® II signal and the use of any special video compression techniques used within a sequence, including DigiCipher® special prediction and block motion estimation.

In both the MPEG-2 and DigiCipher® II syntaxes, a sequence display extension containing, e.g., video format and color description information, is provided in addition to the sequence extension and user data. A subsequent group of pictures header provides, among other information, a time code. Thereafter, a picture header is provided which includes various information pertaining to a corresponding picture in a sequence of pictures to be displayed. A picture extension and, ultimately, the actual picture data to be decoded and reproduced for viewing, is then provided. It is noted that MPEG does not specify the order in which various extensions (such as the sequence display extension) or the user data must be transmitted beyond the fact that they must be after the sequence extension and before the GOP header (if provided) or the picture header. MPEG does not require GOP headers to be sent, and such headers may be bypassed in particular implementations.

In a practical transmission system it may be necessary to include additional data at different times for specific purposes, such as providing closed captioning, VITS, auxiliary real time video, and AMOL data. Such additional data may be carried in the vertical blanking interval (VBI) portions of a television signal, and is referred to herein as "VBI user information." Typically, the insertion of such VBI user information would require a transport syntax to allocate and reserve fixed length portions into which the VBI user information is inserted. If the VBI user information is not used, the fixed length portions would be unusable for other information and bandwidth would be wasted.

It would be advantageous to provide a transport syntax for digital television data that would accommodate various types of VBI user information which may or may not be used at any given time, without requiring space to be reserved for the information in advance. Such a scheme would enable the economical management of bandwidth while providing flexibility as to the transport of VBI user information. The present invention provides a transport method and apparatus enjoying the aforementioned advantages.

SUMMARY OF THE INVENTION

In accordance with the present invention, a bandwidth efficient method is provided for using a digital television data stream to transport variable amounts of different types of information carried in a vertical blanking interval (VBI) portion of a television signal. Information to be transported is extracted from portions of input video data that correspond to vertical blanking intervals of successive video frames. First identifiers are provided for the extracted information. The first identifiers specify a count of a particular type of information associated with the identifier. The first identifiers and the associated information are inserted into VBI related portions of the digital television data stream. The data stream, including the first identifiers and the information, is then communicated to a receiver. The first identifiers enable the adjustment of the data stream to accommodate variable amounts of different types of information without space being reserved for specific amounts and types of information in advance.

Second identifiers can be provided for the extracted information. The second identifiers designate a priority of the particular type of information specified by the first identifiers. In an illustrated embodiment, the first and second identifiers precede the information associated therewith in the data stream. Each second identifier follows a counterpart first identifier. Thus, the syntax provides a first identifier specifying a count of a particular type of information, followed by a second identifier specifying a priority of the information, followed by the information itself. It should be appreciated that each type of information (i.e., "construct," the size of which is dictated by the count) may include a priority, such that a video picture can include constructs of various priorities.

The extracted information can comprise, for example, one or more of closed caption data, non-realtime video data, sampled video data and AMOL data, referred to herein as VBI user information because it is provided in the VBI portions of a television signal. When the extracted information comprises non-realtime video data, the syntax provides sequence numbers and segment numbers for portions of the non-realtime video data. When the extracted information comprises AMOL data, identifiers are provided to designate whether the AMOL data is null data represented in an abbreviated form. For example, where the AMOL data comprises a string of zeros, the string can be runlength coded to avoid the need to send the entire string of zeros, thereby saving bandwidth. The syntax can also provide identifiers to designate parity values for the AMOL data.

In the illustrated embodiment, the digital television data stream is assembled to provide a first identifier in the VBI portions specifying a count for closed caption data, followed by a first identifier specifying a count for non-realtime video data, followed by a first identifier specifying a count for sampled video data, followed by a first identifier specifying a count for AMOL data. It will be appreciated that the syntax formed in this order constitutes only one possible embodiment and that the ordering can be rearranged without departing from the concept of the present invention.

The present invention also provides a method for decoding information communicated in the manner set forth above. In such a decoding method, the digital television data stream is received at a decoder. As the VBI portions of the data stream are reached, the first identifiers are detected. Closed caption data is processed when the first identifier specifying the count of closed caption data indicates the presence of such data. Non-realtime video data is processed when the first identifier specifying the count of non-realtime video data indicates the presence of such data. Sampled video data is processed when the first identifier specifying the count of sampled video data indicates the presence of such data. AMOL data is processed when the first identifier specifying the count of AMOL data indicates the presence of such data.

Where second identifiers are provided in the VBI portions to designate a priority of the particular type of information specified by the first identifiers, the second identifiers are detected in the received data stream. The processing of particular information is inhibited if the priority thereof identified by the corresponding second identifier is not a priority supported by the decoder. In this manner, decoders having different capabilities can be deployed in the field for operation with a common data stream. Information that is not supported by a particular decoder will not adversely affect the operation of the decoder since the decoder will be informed by the priority identifier that it is to ignore the particular information.

Receiver apparatus is provided for decoding information contained in digital television signals. The receiver includes means for detecting information in a vertical blanking portion of a received digital television signal identifying a count of closed caption data, a count of non-realtime video data, a count of sampled video data, and a count of AMOL data that may be present in the vertical blanking portion. Means responsive to the detecting means process the closed caption data when the count of closed caption data indicates the presence of such data in the vertical blanking portion. Means responsive to the detecting means process non-realtime video data when the count of non-realtime video data indicates the presence of such data in the video blanking portion. Means responsive to the detecting means process sampled video data when the count of sampled video data indicates the presence of such data in the vertical blanking portion. Means responsive to the detecting means process the AMOL data when the count of AMOL data indicates the presence of such data in the vertical blanking portion.

The receiver apparatus can further comprise means for detecting information identifying a priority of the received data. Means are provided for inhibiting the processing of the data if the priority is not supported by the receiver apparatus. In an illustrated embodiment, the received digital television signal has an MPEG format.

Apparatus is provided for communicating information in a bandwidth efficient manner in a digital television data stream. Means are provided for extracting information from portions of digital video data that correspond to vertical blanking intervals of successive video frames. At least one particular type of information extracted by the extracting means is quantified and a first identifier is associated therewith. The first identifier specifies a count of the particular type of information following the identifier. Means are provided for combining the extracted information including the first identifiers associated therewith with active video portions of the digital video data to form the digital television data stream. The first identifiers enable the adjustment of the data stream to accommodate variable amounts and types of information without space being reserved for the information in advance.

The apparatus can further comprise means for associating second identifiers with the extracted information. The second identifiers designate a priority of the particular type of information specified by the first identifiers. In the illustrated embodiment, each of the second identifiers is inserted into the data stream following a counterpart first identifier. The first identifiers can provide counts for closed caption data, non-realtime video data, sampled video data and AMOL data.

DETAILED DESCRIPTION OF THE INVENTION

The present invention provides a bandwidth efficient method and apparatus for using a digital television data stream to transport variable amounts of different types of information carried in the VBI portion of a television signal. The information of concern is a subset of a type of user data referred to as "picture user data" to distinguish it from "sequence user data" in an MPEG or DigiCipher® II transport stream. This subset, referred to herein as VBI user information, comprises closed caption data, non-realtime video data, sampled video data, and AMOL data. With the exception of non-realtime video, each of these categories of picture user data are updated each picture. Non-realtime video is updated over a period of several to many pictures. The picture user data is transported in portions of successive video frames which correspond to VBI lines. Each VBI line is represented by 720 eight-bit luminance samples and 720 eight-bit chrominance samples before processing in accordance with the present invention.

Figure 1:
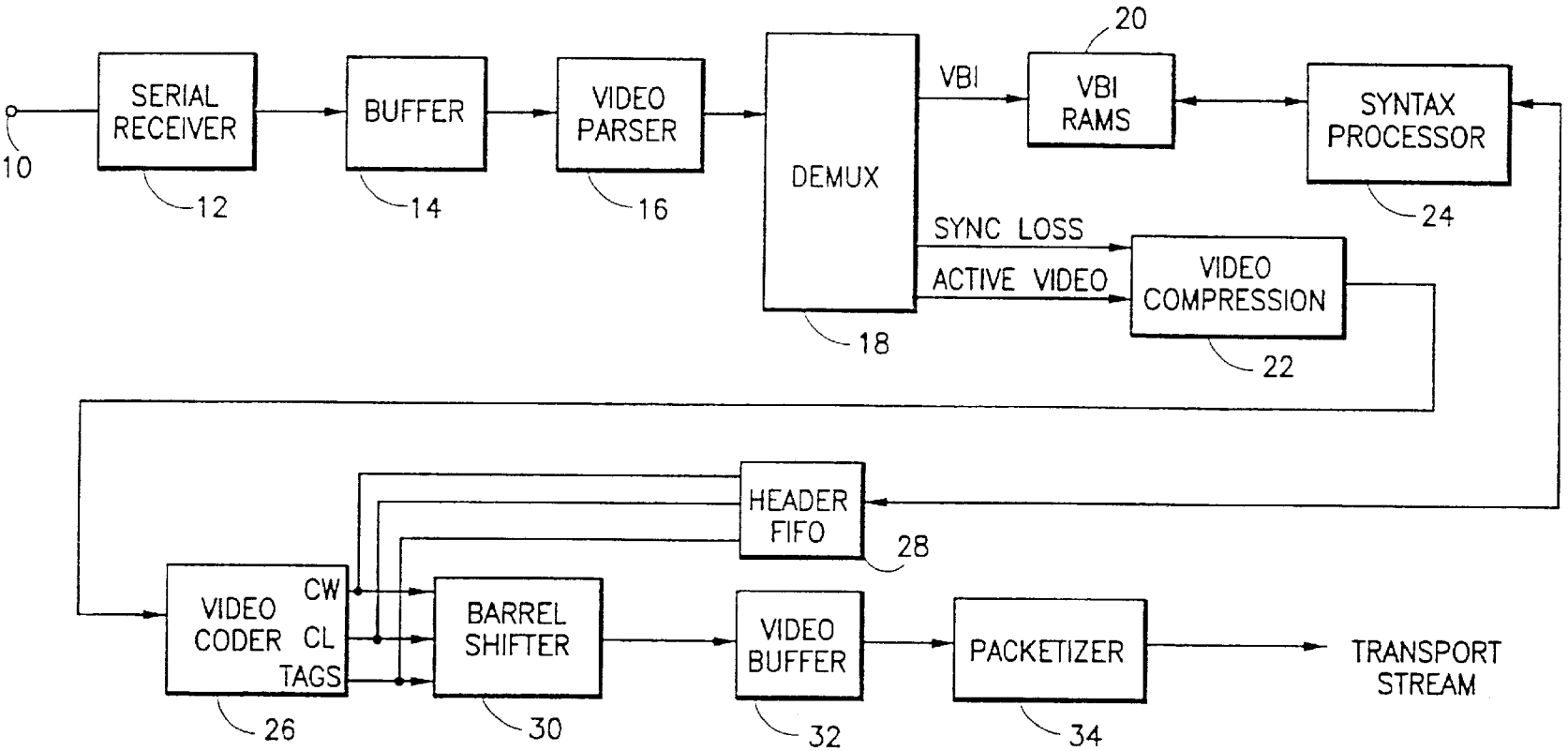
FIG. 1 is a block diagram of a digital video encodes that incorporates the present invention.

FIG. 1 illustrates, in block diagram form, an encoder for processing raw digital video data into a syntax in which variable amounts of different types of VBI user information can be communicated in a digital television data stream. The raw digital video, such as video complying with the Society of Motion Picture and Television Engineers (SMPTE) standard is input to a serial receiver 12 via terminal 10. The serial receiver serializes the data which is input in a parallel format. The serialized data is buffered in a buffer 14, which can comprise a conventional first-in first-out (FIFO) register. A video parser 16 interprets the syntax of the serialized data and strips out various information such as that identifying the start of a new line, the start of a new frame, and the raw luminance and chrominance data. The luminance and chrominance data is input to a demultiplexer 18 where it is separated into data portions corresponding to vertical blanking intervals of successive video frames and the active video portions of those frames. Demultiplexer 18 also determines if synchronization of the acquired data stream has been lost, and if so, outputs a "sync loss" signal to a video compression processor 22, which also receives the active video to be compressed. The video compression processor is a type well known in the art, such as described in U.S. Pat. Nos. 5,376,968; 5,235,419; 5,091,782; or 5,068,724.

The data contained in the VBI portions of the digital video input signal is output from demultiplexer 18 to random access memories (RAMs) 20, which include both a luminance RAM and a chrominance RAM. The RAMs store the data until required by a syntax processor 24 which extracts the VBI user information and builds a syntax enabling the information to be transported efficiently in the VBI portions of a digital television data stream to be communicated to a corresponding decoder, e.g., at an end user location.

The syntax provided by the syntax processor is stored in a header FIFO 28, which is used to assemble transport headers for, e.g., an MPEG or DigiCipher® II implementation of the digital television data stream. The header FIFO provides the syntax information to a barrel shifter 30 that combines the header with the compressed active video from a video coder 26. The video coder 26 codes the compressed video from the video compression processor 22 in a well known manner using, for example, Huffman coding to provide codewords (CW), codeword lengths (CL) and data tags which identify the coded information. The output from barrel shifter 30 is a data stream containing the active video separated by headers which contain information necessary to decode the active video. This data stream is stored in a video buffer 32 which provides the data on an as needed basis to a packetizer 34. The packetizer is a conventional component which assembles the data into transport packets in accordance with a transport stream standard such as the MPEG-2 or DigiCipher® II standard.

Figure 2:
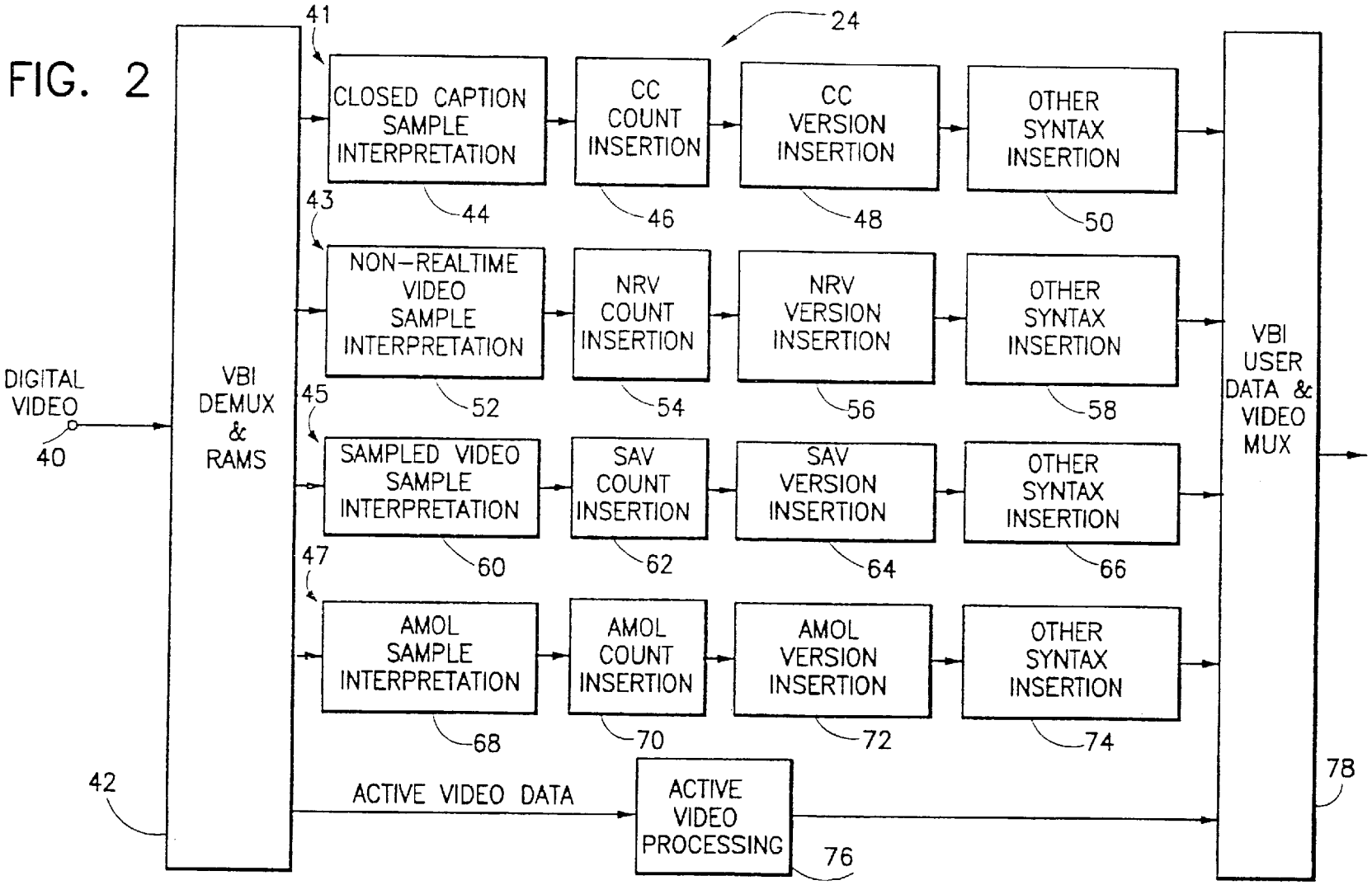
FIG. 2 is a more detailed, conceptual block diagram of the syntax processor illustrated in FIG. 1.

FIG. 2 is a conceptual block diagram showing the operation of syntax processor 24 in greater detail. Digital video (e.g., from video parser 16 in FIG. 1) is input via terminal 40 to a VBI demultiplexer and RAMs 42. This component is actually a combination of demultiplexer 18 and VBI RAMs 20 illustrated in FIG. 1. The demultiplexer outputs active video to the active video processing components 76, which comprise video compression processor 22 and video coder 26 illustrated in FIG. 1.

Portions of the VBI data containing closed caption information are input from the demultiplexer and RAMs 42 to a closed caption processing path generally designated 41. Non-realtime video data from the digital video data stream input to terminal 40 is output by the demultiplexer and RAMs 42 to a non-realtime video processing path generally designated 43. Similarly, sampled video is output to a sampled video processing path generally designated 45, and AMOL data is output to an AMOL processing path generally designated 47. Each of the processing paths 41, 43, 45 and 47 provide sample interpretation, count insertion, priority insertion and other syntax insertion in accordance with the prescribed picture user data bitstream syntax. This syntax is described below using the formal grammar used by the MPEG transport standard.

The MPEG grammar is a C-language-like syntax and is a method of describing continuous and possibly variable rate sequences of bits, instead of specifying a procedural program and its functions as in the computer language C. The first column of the syntax contains the syntax element. The second column gives the length of the syntax elements in bits and the third column identifies the syntax type. The types are bslbf (bit string left-most bit first) and uimsbf (unsigned integer most significant bit first). The header "user_data ( ) { . . . }" indicates that the syntax elements within the braces are a named set and may be invoked elsewhere in the syntax by simply using the designation "user_data ( )". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. The following picture user data bitstream syntax and bitstream semantics represent a preferred embodiment of the present invention:

| Syntax | No. Bits | Mnemonic |
|---|---|---|
| user_data( ) { | | |
| user_data_start_code | 32 | bslbf |
| user_data_type_code | 8 | uimsbf |
| if (user_data_type_code == '0×03') { | | |
| reserved | 1 | bslbf |
| picture_special_frame_flag | 1 | bslbf |
| picture_special_field_flag | 1 | bslbf |
| picture_sp_mv_scale_flag | 1 | bslbf |
| reserved | 3 | bslbf |
| vbi_data_flag | 1 | bslbf |
| if (vbi_data_flag) { | | |
| cc_count | 5 | uimsbf |
| for (i=0 ; i<cc_count ; i++) { | | |
| cc_priority | 2 | uimsbf |
| field_number | 2 | uimsbf |
| line_offset | 5 | uimsbf |
| cc_data_1[1:8] | 8 | bslbf |
| cc_data_2[1:8] | 8 | bslbf |
| marker_bit | 1 | bslbf |
| } | | |
| non_real_time_video_count | 4 | uimsbf |
| for (i=0; i<non_real_time_video_count ; i++) { | | |

-continued

| Syntax | No. Bits | Mnemonic |
|---|---|---|
| non_real_time_video_priority | 2 | uimsbf |
| sequence_number | 2 | uimsbf |
| non_real_time_video_field_number | 1 | uimsbf |
| line_offset | 5 | uimsbf |
| if (sequence_number !='00') { | | |
| segment_number | 5 | uimsbf |
| for (i=0 ; i<32 ; i++) } | | |
| non_real_time_video_y_data[7:0] | 8 | uimsbf |
| } | | |
| for (i=0 ; i<16 ; i++) { | | |
| non_real_time_video_cb_data[7:0] | 8 | uimsbf |
| non_real_time_video_cr_data[7:0] | 8 | uimsbf |
| } | | |
| } | | |
| } | | |
| sampled_video_count | 3 | uimsbf |
| for (i=0 ; i<sampled_video_count ; i++) { | | |
| sampled_video_priority | 2 | uimsbf |
| field_number | 2 | uimsbf |
| line_offset | 5 | uimsbf |
| for (i=0 ; i<704 ; i++) { | | |
| sampled_video_y_data[7:0] | 8 | uimsbf |
| } | | |
| for (i=0 ; i<352 i++) { | | |
| sampled_video_cb_data [7:0] | 8 | uimsbf |
| sampled_video_cr_data[7:0] | 8 | uimsbf |
| } | | |
| } | | |
| amol_count | 4 | uimsbf |
| for (i=0 ; i<amol_count ; i++) } | | |
| amol_priority | 2 | uimsbf |
| field_number | 2 | uimsbf |
| line_offset | 5 | uimsbf |
| frame_counter[4:0] | 5 | uimsbf |
| amol_data_parity | 1 | uimsbf |
| non_zero_amol_flag | 1 | bslbf |
| if (non_zero_amol_flag) { | | |
| amol_data[1:20] | 20 | bslbf |
| marker_bit | 1 | bslbf |
| amol_data[21:35] | 15 | bslbf |
| } | | |
| } | | |
| } | | |
| reserved | n | bslbf |
| } | | |
| next_start_code( ) | | |
| } | | |

Picture User Data Bitstream Semantics user_data_type_code—An eight-bit code for picture user data, 03 in hexadecimal. Note that the encoder shall send no more than one picture user data construct after any given picture header.

picture_special_frame_flag—When set to 1, this flag indicates that special frame prediction is used on the current picture. This flag overrides the value of sequence_special_frame_flag, and it is ignored for all pictures except P-pictures.

picture_special_field_flag—When set to 1, this flag indicates that special frame prediction is used on the current picture. This flag overrides the value of sequence_special_field_flag, and it is ignored for all pictures except P-pictures.

picture_sp_mv_scale_flag—Has meaning only when either the picture_special_frame_flag or picture_special_field_flag is set, affecting the scaling for the current P-picture. When set to 1, a scaling of 3/2 and 1/2 is indicated, while 0 indicates unity scaling. This flag overrides the value of sequence_sp_mv_scale_flag, and is ignored except for P-pictures where either special_frame_flag or special_field_flag is set to 1.

vbi_data_flag—Indicates that one or more VBI data constructs follow (closed captions, real-time or non-real-time sampled video, and/or AMOL).

Note: In the preferred embodiment, the encoder will satisfy all the following general requirements with regard to VBI data:

1. The encoder shall pack picture user data in decode order, storing the VBI data to be reconstructed from a given picture in the picture user data of the same picture.
2. The encoder shall transport the VBI data for the repeated field with the picture that transports the video data for the field to be repeated.
3. The encoder shall transport, for a given picture and VBI data type, all the VBI data for the first display field followed by all the VBI data for the second display field followed by all the VBI data for the third (repeated) display field, if present. Also, for a given picture, VBI data type, and field, the encoder shall transport all the VBI data for the first line followed by all the VBI data for the second line, etc.

cc_count—A five-bit integer (values in the range [0:31]) indicating the number of closed caption constructs following the field. All such constructs must occur in the intended display order, assuming an interlaced display.

cc_priority—A number between 0 and 3 indicating the priority of constructs in picture reconstruction where different levels of hardware capability exist. For closed caption constructs, up to four lines per display field (including Line 21) can be labeled as priority zero.

field number—The number of the field, in display order, from which the VBI data originated, interpreted as follows:

| Value: | Meaning: |
|---|---|
| 00 | Forbidden |
| 01 | 1st display field |
| 10 | 2nd display field |
| 11 | 3rd display field (the repeated field in film mode). |

line_offset—A five-bit integer giving the offset in lines from which the VBI data originated, relative to the base VBI frame line (line 10 of NTSC field 1, line 273 of field 2), as specified in CCIR Report 624-4.

cc_data_1[1:8]—Data for the first closed caption character for this field such that the first received bit is the first bit reconstructed on the video line as displayed from left to right.

cc_data_2[1:8]—Data for the second closed caption character for this field such that the first received bit is the first bit reconstructed on the video line as displayed from left to right.

The encoder shall compress closed caption data to the 16-bit representation and shall pack these bits into picture data starting with the least significant bit of the first character and ending with the most significant bit of the second character.

non_real_time_video_count—Indicates the number of non-real-time video constructs that follow. This field can have values of 0 through 15. All such constructs must occur in the intended display order, assuming an interlaced display.

non_real_time_video_priority—A number between 0 and 3 used by the decoder to determine if it is required to reconstruct the particular non-real-time VBI line. For non-real-time sampled video, only a single line may be labeled as priority zero. Thus the decoder that can reconstruct one line need only reconstruct priority 0.

sequence_number—Numbers each sequence of non-real-time video segments, starting from 1 and counting to 3, before rolling over to 1 again. A sequence_number of 0 indicates the non-realtime sampled video line is not to be reconstructed (is inactive) until a segment is received with a non-zero sequence_number and therefore the corresponding fields do not follow for this construct. The sequence number shall be incremented by one between sequences.

non_real_time_video_field_number—A one-bit number indicating the field into which the decoder must reconstruct the non-real video line, interpreted as follows:

| Value: | Meaning: |
|---|---|
| 0 | Odd field |
| 1 | Even field |

segment_number—The number of the non-realtime sampled video segment starting with 0001.

The encoder shall segment non-realtime sampled video into 64-byte segments and transport each as an array of 32 luminance (Y) samples followed by an array of 16 chrominance sample pairs (Cb, Cr), starting with the most significant bit of the leftmost sample. All segments of the sequence shall be transmitted in order before any segment of a new sample of the same non-realtime video line.

non_real_time_video_y_data[7:0] The non-realtime sampled video luminance data for this segment such that the first bit is the most significant bit of the code word.

non_real_time_video_cb_$_{data}$[7:0]—The non-realtime sampled video chrominance Cb data for this segment such that the first bit is the most significant bit of the code word.

non_real_time_video_cr_data[7:0]—The non-realtime sampled video chrominance Cr data for this segment such that the first bit is the most significant bit of the code word.

sampled_video_count—Indicates the number (values 0 through 7) of real-time sampled video constructs that follow this field. All such constructs must occur in the intended display order, assuming interlaced display.

sampled_video_priority—A number between 0 and 3 used by the decoder to determine if it is required to reconstruct the particular sampled video line. For real-time sampled video, only a single line may be labeled as priority zero. Thus the decoder that can reconstruct one line need only reconstruct priority 0.

sampled_video_y_data[7:0]—The real-time sampled video luminance data for this construct such that the first bit is the most significant bit of the code word.

sampled_video_cb_data[7:0]—The real-time sampled video chrominance Cb data for this construct such that the first bit is the most significant bit of the code word.

sampled_video_cr_data[7:0]—The real-time sampled video chrominance Cr data for this construct such that the first bit is the most significant bit of the code word.

amol_count—Indicates the number of AMOL constructs that follow this field and can have values of 0 through 15. All such constructs must occur in the intended display order, assuming an interlaced display.

amol_priority—A number between 0 and 3 used by the decoder to determine if it is required to reconstruct the particular AMOL line. For AMOL, only a single line may be labeled as priority zero. Thus the decoder that can reconstruct only line 20 need only reconstruct priority 0.

frame_counter[4:0]—The frame address for an AMOL construct where the msb corresponds with AMOL bit #8 and the lsb corresponds with AMOL bit #12 of ACN 403-1122-000.

amol_data_parity—The parity value for an AMOL construct that corresponds with AMOL bit #48 of ACN 403-1122-000.

non_zero_amol_flag—Set when AMOL bits #13 through #47 are not all zero and therefore the value of these bits are conveyed in the following field.

amol_data[1:35]—The value of AMOL bits #13 through #47 of ACN 403-1122-000, where amol_data[1] corresponds with AMOL bit #13 and amol_data[35] corresponds with AMOL bit #47.

The above syntax is assembled by the components of syntax processor 24 illustrated in FIG. 2. In the preferred embodiment, these components are implemented in firmware. In path 41, the closed caption data is processed by a sample interpretation function which extracts 16 bits of closed caption data from a total of 1408 samples (704 samples luma, 704 samples chroma) of each VBI line containing closed caption data. The closed caption (CC) count insertion function 46 counts the number of closed caption constructs extracted from the current video field. As indicated in the picture user data bitstream semantics, the count can have a value of from 0–31. The CC priority insertion function 48 inserts the priority of the closed caption data, so that decoders which support the current priority will decode the closed caption data and decoders which do not support the present priority will not decode the data. All other syntax information, such as the field number, line offset, and marker bits are inserted by the "other syntax insertion" function 50. The syntax output from path 41 corresponds to that indicated above in the picture user data bitstream syntax under the heading "CC_count."

Non-realtime video is processed in path 43. The encoder needs to segment the VBI data in order to spread the load over multiple pictures when the picture user data load changes by a significant percentage of the allocated service data rate. This applies primarily to non-realtime video. In order to reduce the complexity of the algorithm that the encoder uses to spread the non-realtime video loading over pictures, the non-realtime video update rate is limited to values which are integer multiples of twenty-two pictures. In order to provide robustness to the loss of transport packets, especially the last segment of a non-realtime video sequence, segment and sequence numbers are provided in the syntax for non-realtime video to allow the decoder to detect lost non-realtime video segments. Since non-realtime video data is transported in segments, it is preferable for the decoder to have the capability of double buffering non-realtime video data to allow display of the current line during receipt of the next line. In order to instruct the decoder to stop waiting for the arrival of new non-realtime video segments and to stop reconstructing a current line, the encoder will transmit several constructs for the particular field and line with a sequence value of zero. This signals the decoder to stop (i.e., deactivate) a non-realtime video line.

Further, the encoder will transmit all segments of a non-realtime video sequence in order before transmitting any segment of a new sample of the same non-realtime video line. The sequence number is incremented by one between non-realtime video sequences. The transition of a non-realtime video line from active to inactive can be indicated by the encoder by packing picture user data for that non-realtime video line with the sequence number set to zero for four pictures. Also, no corresponding luminance or chrominance samples are transported in this case, as specified in the picture user data syntax.

Non-realtime video data is segmented into 64-byte segments for transport as left-most sample first. The encoder transports each non-realtime video data segment as an array of 32 luminance samples (Y) starting with the most significant bit of the left-most sample. The luminance samples are followed by an array of 16 chrominance sample pairs (Cb, Cr) starting with the most significant bit of the left-most sample. The encoder is capable of sampling, compressing and transporting one line of non-realtime video with each video frame. Non-realtime video is sampled at rates ranging from once per 22 pictures to once per 484 pictures in increments of 22 pictures. Non-realtime video is processed at full resolution of 704 horizontal samples per line. The segmenting of the non-realtime video data over 22 pictures is performed by the non-realtime video sample interpretation function 52. 704 samples each of luminance and chrominance data are output from the sample interpretation function in samples of 32 bytes each. A count of non-realtime video data per frame is maintained by non-realtime video (NRV) count insertion function 54. This provides the non_real_time_video_count set forth in the picture user data bitstream syntax and semantics. The non-realtime video priority is inserted by NRV priority insertion function 56, to enable decoders to ignore those priorities that they do not support. The remaining non-realtime video syntax, including the sequence number, non-realtime video field number, line offset and segment number are inserted by the "other syntax insertion" function 58 in non-realtime video processing path 43. It is noted that the non-realtime video feature can be used to support a vertical interval test signal (VITS), by transporting the 704 samples of VITS over the period of several frames. Other data, such as a vertical interval reference (VIR) signal, can also be transported using the non-realtime video path. By segmenting the data and sending it piecemeal over a plurality of lines, the non-realtime video capability of the syntax enables the bandwidth used by data services such as VITS to be significantly reduced.

Sampled video processing is provided in path 45. Sampled video is similar to non-realtime video, but is provided real time. Thus, instead of segmenting the data contained in a video line over a plurality of frames, a new video line is provided every frame or field. Sampled video can be used to support any generic video that a broadcaster or programmer wants to transmit.

The sampled video data is interpreted by sampled video sample interpretation function 60. The sampled luminance and chrominance information is counted by a sampled video (SAV) count insertion function 62. The sampled video priority is inserted by SAV priority insertion function 64 to enable decoders that do not support the SAV priority to ignore the SAV data. Other syntax insertion, including field number and line offset, is provided by the "other syntax insertion" function 66 in path 45.

Programming lineup information used by the A. C. Nielson Company for market research and referred to as "Automated Measurement of Lineup" (AMOL) is also provided by the user data syntax. This data is used by a market research processor provided to various television viewers and records every program watched and the time at which it is watched. Television commercials have their own AMOL and this feature can be used by advertisers to verify the proper broadcasting of commercials during a program lineup. The AMOL information is inserted into line 22 of field 2 of each television frame in the National Television Systems Committee (NTSC) broadcasting standard. Line 22 is an active video line, and thus a decoder may commence processing active video with line 23 instead of line 22 for NTSC signals. Within a 30-frame sequence, the AMOL line for each frame will typically be present, but the data for most frames will generally be null. However, the definition of the parity bit is subject to change in each AMOL line. Thus, the syntax includes a bit that indicates whether or not the thirty-five AMOL data bits are zero for each frame, allowing the syntax to avoid the need to send the zero data. Instead, the non_zero_AMOL_flag bit of the syntax is cleared to indicate, using a single bit, that the entire AMOL line is null. The syntax always sends the parity bit, regardless of the data content, since the parity is subject to change even when no data is present.

The processing of AMOL data by path 47 illustrated in FIG. 2 is similar to the processing of the sampled video. Interpretation of the AMOL data is provided by the AMOL sample interpretation function 68. If AMOL data is present, it is counted and the data count is inserted into the syntax by the AMOL count insertion function 70. The AMOL priority is inserted by function 72 to enable decoders which do not support this AMOL priority to skip over the AMOL data. The remaining AMOL syntax elements, including the field number, line offset, AMOL data parity and non-zero AMOL flag, as well as a marker bit if necessary are inserted by the "other syntax insertion" function 74 of AMOL processing path 47.

The VBI syntax comprising all of the closed caption, non-realtime video, sampled video and AMOL data contained in the digital video signal is multiplexed with the active video output from the active video processing components 76 in a VBI user data and video multiplexer 78. This multiplexer provides the functions of the header FIFO 28 and barrel shifter 30 illustrated in FIG. 1. The multiplexed data stream output from multiplexer 78 is buffered and packetized to provide the final transport stream for communication to a population of decoders.

Figure 3:
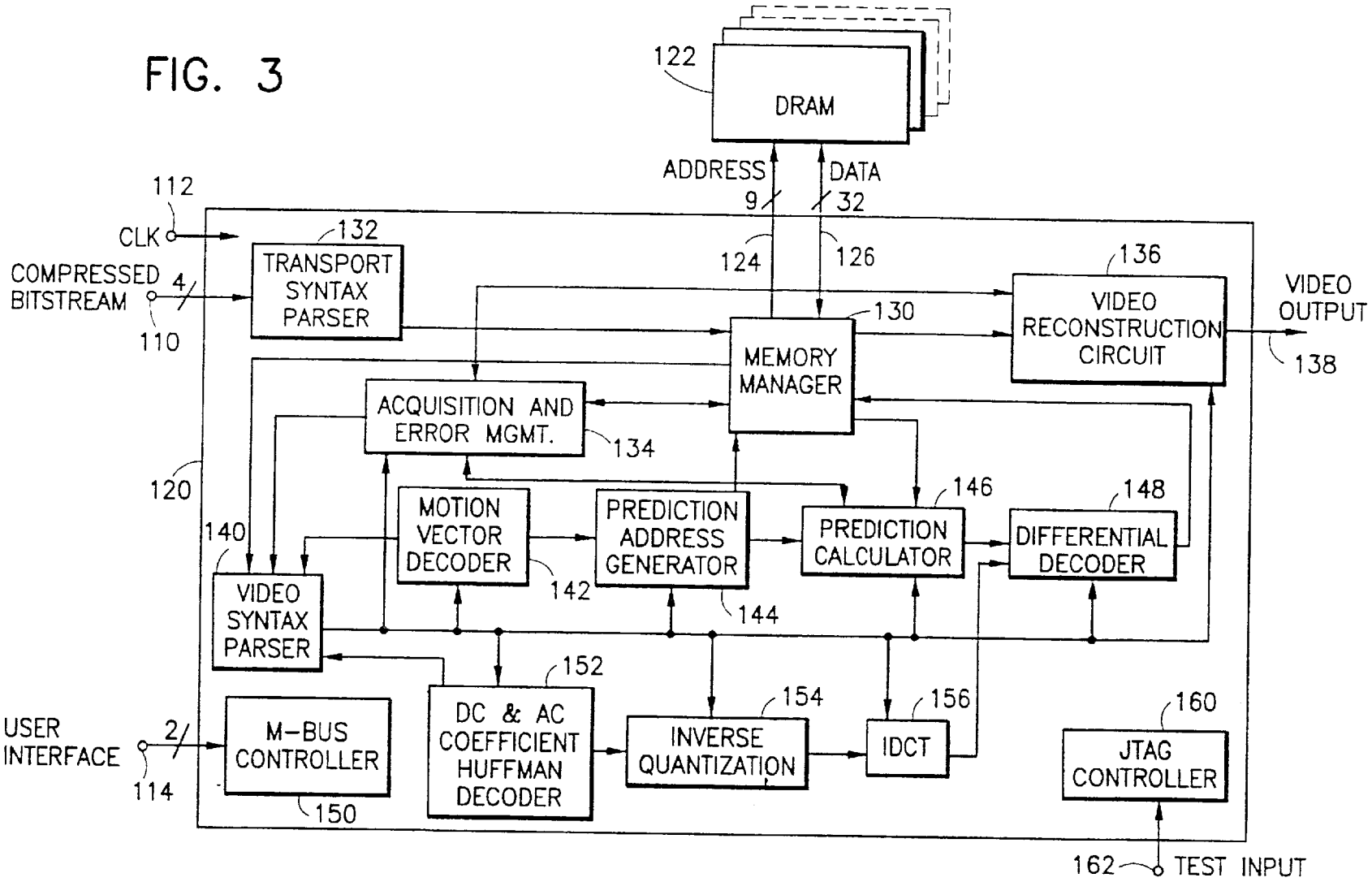
FIG. 3 is a block diagram of a video decompression processor incorporating the present invention.

FIG. 3 is a block diagram of a video decompression processor (i.e., decoder) for processing a received data stream that contains the VBI user data syntax detailed above. The video decompression processor (VDP) incorporates a memory manager 130 that addresses an external DRAM 122 to store and retrieve video data necessary to reconstruct a television program at a receiver. The processor, generally designated 120, is a pipelined processor designed to decode both the transport layer (i.e., control and other non-video information) and the video layer of the compressed bitstream input via terminal 110, sometimes referred to as the "transport packet interface" of the video processor.

A user processor interface is provided at terminal 114 for control of the video data processor via an M-bus controller 150 that configures various registers in processor 120. The M-bus is a two-wire, bidirectional serial bus which provides a simple and efficient means of data exchange between devices, and is fully compatible with the $I^2C$ bus standard.

An interface to the DRAM 122 is provided via address lines 124 and data lines 126. In the example illustrated in FIG. 3, DRAM 122 has a nine bit address port and a thirty-two bit data port.

A video output interface 138 is provided for the decompressed, reconstructed video which may, for example, be output as a standard CCIR (International Radio Consultive Committee) 656, eight bit, twenty-seven Mhz multiplexed luminance (Y) and chrominance (Cr, Cb) signal.

A test interface can be provided via terminal 162 to a conventional JTAG (Joint Test Action Group) controller 160. JTAG is a standardized boundary scan methodology used for board-level testing to detect faults in package and board connections, as well as internal circuitry.

The video decompression processor 120 receives a clock signal via terminal 112. The clock provides timing information that is used, e.g., to enable a transport syntax parser 132 to recover timing information and video information from transport packets contained in a packetized data stream input via terminal 110. An acquisition and error management circuit 134 utilizes a program clock reference (PCR) and decode time stamp (DTS) detected by a video syntax parser 140 to synchronize the start of picture decoding. This circuit sets vertical synchronization and provides global synchronization for all video decode and display functions.

The video layer is buffered in an input buffer (FIFO) configured in the external DRAM 122 by memory manager 130. The video syntax parser 140 receives the compressed video data output from the DRAM FIFO via memory manager 130, and separates the motion vector information from the coefficients describing the video information. The coefficients are processed by a Huffman decoder 152, inverse quantizer 154, and inverse discrete cosine transform (IDCT) processor 156.

Motion vectors are recovered and used to address previously decoded video frames required for reconstructing a current video frame. In particular, a motion vector decoder 142 decodes the motion vectors received from video syntax parser 140 and passes them to a prediction address generator 144. The prediction address generator provides address information necessary to retrieve, via memory manager 130, the necessary anchor frame (i.e., intraframe (I) or prediction (P) frame) data to enable prediction calculator 146 to provide a prediction signal necessary to reconstruct a current frame block. Differential decoder 148 combines the prediction data with the decoded coefficient data to provide decompressed video data. The decompressed data is stored in appropriate buffers of DRAM 122 via memory manager 130. It should be appreciated that the video decompression processes carried out by motion vector decoder 142, prediction address generator 144, prediction calculator 146, differential decoder 148, Huffman decoder 152, inverse quantizer 154 and IDCT 156 are generally conventional and well understood by those skilled in the art.

Memory manager 130 schedules all activity on the external DRAM address and data buses 124, 126 and efficiently addresses DRAM 122. The memory manager insures that the data transfer requirements of the input FIFO portion of DRAM 122, the video syntax parser 140 and the video reconstruction circuit 136 (as well as prediction calculator 146 and differential decoder 148) are all met. The video reconstruction circuit 136 calculates a current picture and processes the VBI user data in order to insert any closed caption, non-realtime video (including VITS), sampled video and AMOL data, as well as any test pattern data, for output on video output line 138. The display of the output data is synchronized by comparing the time specified by the decoder time clock to a presentation time stamp (PTS), which indicates when the video is to be presented for display. A determination of when the decoding and display of a video frame must commence is made by comparing a decode time stamp (DTS) to the PTS.

DRAM 122 is illustrated as an external memory and may be provided by a plurality of DRAM chips, such as two, four Mbit (megabit, i.e., $2^{20}$ bits) DRAMs for an eight Mbit implementation or four, four Mbit DRAMs for a sixteen Mbit implementation. It should be appreciated that in future implementations, and as memory technology advances, DRAM 122 may be provided as internal memory within the video decompression processor. The DRAM is mapped to provide various decode and output video buffers as well as a circular FIFO buffer for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 130 to provide different memory maps as required when variables are modified such as PAL or NTSC video, eight or sixteen Mbit memory configuration, and whether B-frames are present.

As indicated above, the memory manager 130 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

When a packetized bitstream containing compressed video data is input to terminal 110 of video decompression processor 120, video frames represented by the compressed data are reconstructed one at a time. Initially, a full frame of video data will have to be received and stored in DRAM 122. Information for subsequent video frames can comprise a subset of the full video frame which, when added to prediction data from the prior video frame (stored in DRAM 122) will result in the reconstruction of a full frame.

Figure 4:
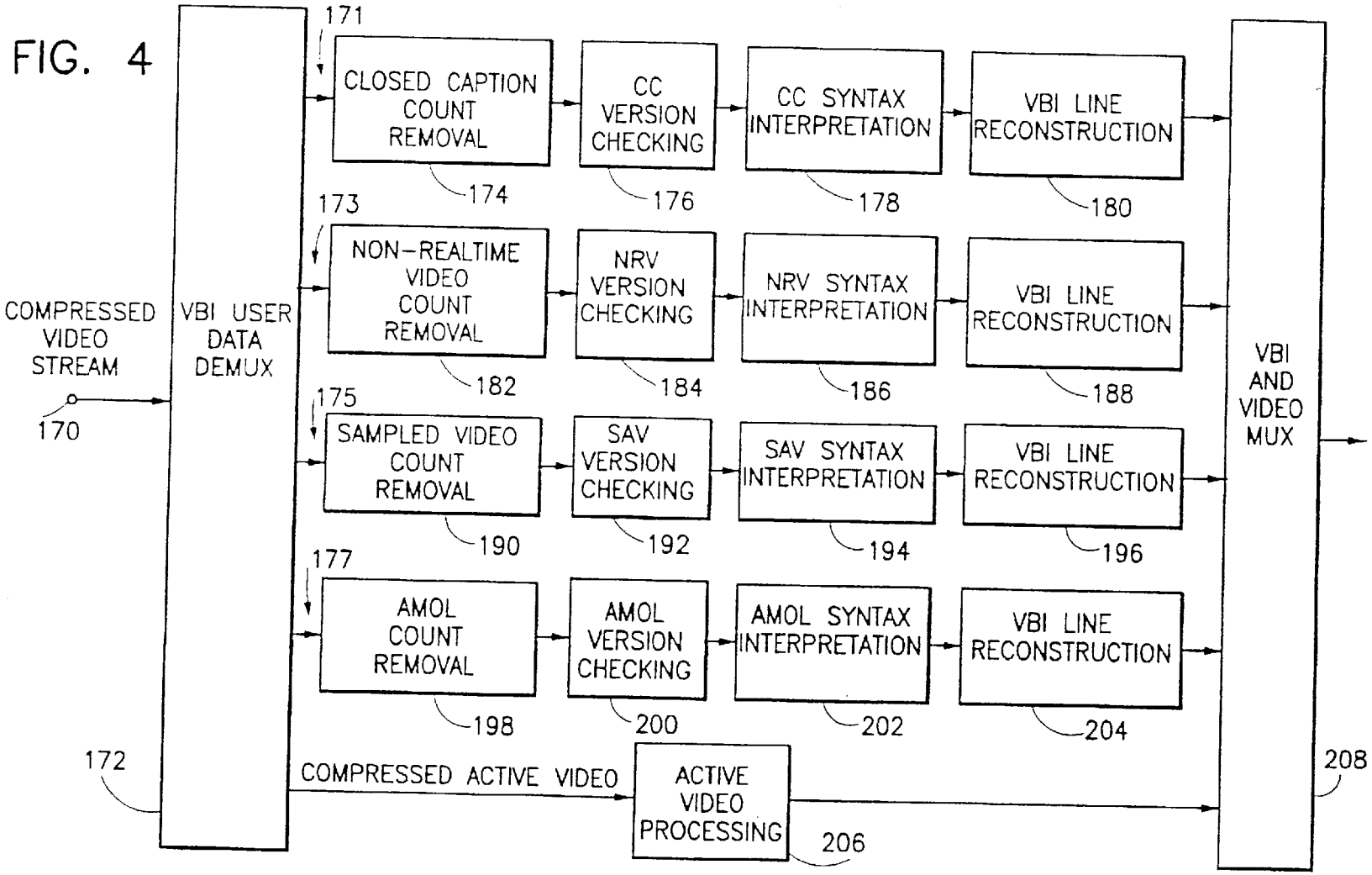
FIG. 4 is a more detailed, conceptual block diagram of the video reconstruction circuit illustrated in FIG. 3 as it relates to the present invention.

FIG. 4 is a functional block diagram illustrating the reconstruction of the VBI user information into the digital video data stream at the decoder. The compressed bitstream is input via terminal 170 to a VBI user data demultiplexer 172. The demultiplexer function is provided by the video syntax parser 140 of FIG. 3, which demultiplexes the compressed bitstream to provide the closed caption user data, non-realtime video user data, sampled video user data, AMOL user data, and the active video. Active video processing is provided by function 206 which receives the active video, decompresses it (e.g., using well known motion estimation and compensation techniques) and outputs the decompressed video to a VBI and video multiplexer 208.

The closed caption data is processed by a closed caption processing path generally designated 171. The closed caption count is removed by function 174, which identifies the number of closed caption constructs to be processed for the current video field or frame. The closed caption priority indicated by the user data syntax is then checked to determine if it is a priority that the decoder supports. If so, the priority checking function 176 will enable the closed caption syntax interpretation function 178 to interpret the remaining syntax, including the field number and line offset, and to recover the actual closed caption data. Any marker bits, which are used to prevent the false detection of a new start code by the decoder, will be ignored.

After the syntax has been interpreted, the VBI lines carrying the closed caption data are reconstructed by function 180. The 16 bits of closed caption data from the syntax interpretation function 178 are reconstructed into a conventional VBI line having the equivalent of 704 luminance samples and 704 chrominance samples. The reconstructed lines are output to VBI and video multiplexer 208 where they are assembled with the non-realtime video, sampled video and AMOL data recovered by paths 173, 175 and 177, respectively, and the decompressed active video output from the active video processing function 206.

The non-realtime video path 173, sampled video path 175 and AMOL path 177 operate similarly to the closed caption path 171. The non-realtime video count is removed by function 182, and priority checking for non-realtime video is performed by function 184. If the priority is supported by the particular decoder, the non-realtime video syntax will be interpreted by function 186 and the VBI line carrying the non-realtime video data will be reconstructed by function 188. The non-realtime video feature can provide functions such as double buffering of the VITS line, checking of sequence numbers and dropping segments of the previous sequence when a segment of a new sequence is received, and checking for a "sequence=0" condition which indicates that the reconstruction of the given VITS line should be terminated.

Sampled video count is removed by function 190 and the sampled video priority is checked by function 192. If the decoder supports the sampled video priority, the syntax is interpreted by function 194 and the VBI lines carrying the sampled video data are reconstructed by function 196.

The AMOL count is removed by function 198 and the AMOL priority is checked by function 200. If the AMOL priority is supported, the AMOL syntax is interpreted by function 202. The VBI line carrying the AMOL data (i.e., line 22) is reconstructed by function 204.

The output of multiplexer 208 will contain all of the transmitted VBI user information together with the decompressed active video, in the original format presented to the VBI DEMUX and RAMs 42 illustrated in FIG. 2. Thus, multiplexer 208 will output a reconstructed priority of the original digital video processed by the encoder.

It should now be appreciated that the present invention provides a method and apparatus for encoding, communicating and decoding picture user data for digital television. The picture user data syntax allows the transport of closed captions, non-realtime video, sampled video and AMOL. The encoder packs picture user data in decode order so that VBI data will arrive in the picture user data following the picture header of the picture into which the VBI line will be reconstructed. The presence of VBI data is conditional in the picture user data syntax. More particularly, a VBI data flag is provided which specifies whether or not the user data contains any VBI data. Count values preceding each set of VBI data constructs allow decoders to skip closed caption and sampled video data, if no such data is provided. Since the constructs for non-realtime video and AMOL depend on content, the count value is not sufficient to calculate the size of the set of constructs. Therefore, decoders must parse through these constructs if they support subsequent VBI data types, even though there may be no non-realtime video or AMOL data present.

For each picture which does not require any VBI data, the encoder will clear the VBI data flag and not include any of the subsequent constructs specified in the picture user data syntax. In the case of film mode processing (e.g., 3:2 pulldown), the encoder will transport the VBI data for the repeated field with the picture that transports the video data for the field to be repeated. The encoder will transport, for a given picture and VBI data type, all of the VBI data for the first display field followed by all of the VBI data for the second display field followed by all of the VBI data for the third (repeated) display field, if required. For a given picture, VBI data type and field, the encoder will transport all of the VBI data for the first line followed by all of the VBI data for the second line, etc. As an example, the closed caption data for a given picture will be transported in the following order for a three-field film mode picture with a display order f2, f1, f2 and closed captions on lines 14, 16 and 21 of field 2 and lines 15 and 21 of field 1:

. . . d1-14, d1-16, d1-21, d2-15, d2-21, d3-14, d3-16, d3-21 . . .

where f1 is the odd field, f2 is the even field, d1 is the first display field, d2 is the second display field, and d3 is the third display field.

It is important to note that the encoder should not use line offset values which indicate reconstruction of VBI services into active video. In a preferred implementation, the encoder compresses closed caption data to a 16-bit representation. The 16 bits are packed into the picture user data in the order in which they occur in the video line from left to right, starting with the least significant bit of the first character and ending with the most significant bit of the second character.

The decoder does not require picture user data to accompany any or all of the pictures. All VBI data from the picture user data of the current service's video syntax will be received by the decoder. The decoder will not reconstruct a given VBI data construct unless the priority field of the construct indicates that the priority is supported by the decoder.

In processing non-realtime video data, the decoder will search for the first segment to indicate the start of a non-realtime video data sequence. The decoder will not consider all of the non-realtime video segments to be received until it has received each segment of the sequence in the proper order. A non-realtime video service will not be reconstructed until all segments have been received, at which time non-realtime video is processed at full resolution. The decoder will then display the current non-realtime video line while receiving the next non-realtime video line. The next non-realtime video line will be displayed when all of its segments have been received.

If the decoder receives a segment of a new non-realtime video sequence before receiving all segments of the current non-realtime video sequence, it will discard the non-realtime video associated with the current sequence. Receipt of each segment of the new sequence will then commence. Reconstruction of any non-realtime video line will be terminated if the picture user data of one or more consecutive picture user data constructs indicates that the non-realtime video line is not active. This indication can be provided by a sequence number that is zero.

Although the invention has been described in connection with various specific embodiments, it should be appreciated that numerous adaptations and modifications may be made thereto without departing from the spirit and scope thereof as set forth in the claims.

We claim:

1. A bandwidth efficient method for communicating variable amounts of a plurality of different types of user information in a digital television data stream, comprising the steps of:

extracting user information from portions of input video data that correspond to vertical blanking intervals (VBIs) of successive video frames;

providing a first identifier for each type of the extracted user information, each of said first identifiers specifying a count of the user information associated with the identifier;

inserting said first identifiers and the associated user information into a video syntax for said digital television data stream such that each type of said user information can be identified by a relative position of said first identifiers in the video syntax; and communicating said data stream including said first identifiers and associated user information to a receiver;

wherein said first identifiers enable the adjustment of said data stream to accommodate variable amounts of different types of user information without space being reserved for specific amounts and type of user information in advance.

2. A method in accordance with claim 1 comprising the further steps of:

providing a second identifier for each type of the extracted user information; and inserting said second identifiers into the video syntax;

said second identifiers designating a priority of the particular type of user information specified by said first identifiers;

wherein said priority corresponds to a hardware capability level for processing the particular type of user information.

3. A method in accordance with claim 2 wherein said first and second identifiers precede the user information associated therewith in said video syntax, with each second identifier following a counterpart first identifier.

4. A method in accordance with claim 1 wherein the extracted user information comprises non-realtime video data, said method comprising the further step of:

providing second and third identifiers for said non-realtime video data, said second identifiers designating a sequence number and said third identifiers designating segment numbers for portions of said non-realtime video data.

5. A method in accordance with claim 1 wherein the extracted user information comprises AMOL data, said method comprising the further step of:

providing second identifiers to designate whether the AMOL data is null data represented in an abbreviated form.

6. A method in accordance with claim 5 comprising the further step of:

providing third identifiers to designate parity values for said AMOL data.

7. A method in accordance with claim 1 wherein the extracted user information inserted into said video syntax comprises at least one of closed caption data, non-realtime video data, sampled video data, and AMOL data.

8. A method in accordance with claim 1 wherein said video syntax is assembled to provide a first identifier specifying a count for closed caption data, followed by a first identifier specifying a count for non-realtime video data, followed by a first identifier specifying a count for sampled video data, followed by a first identifier specifying a count for AMOL data.

9. A method in accordance with claim 1 wherein said video syntax is assembled to provide a first identifier specifying a count for closed caption data, a first identifier specifying a count for non-realtime video data, a first identifier specifying a count for sampled video data, and a first identifier specifying a count for AMOL data.

10. A method for decoding user information communicated in accordance with the method of claim 7 comprising the steps of:

receiving said digital television data stream at a decoder and detecting said first identifiers therein; and processing said closed caption data when the first identifier specifying said count of closed caption data indicates the presence of such data.

11. A method for decoding user information communicated in accordance with the method of claim 7 comprising the steps of:

receiving said digital television data stream at a decoder and detecting said first identifiers therein; and processing said non-realtime video data when the first identifier specifying said count of non-realtime video data indicates the presence of such data.

12. A method for decoding user information communicated in accordance with the method of claim 7 comprising the steps of:

receiving said digital television data stream at a decoder and detecting said first identifiers therein; and processing said sampled video data when the first identifier specifying said count of sampled video data indicates the presence of such data.

13. A method for decoding user information communicated in accordance with the method of claim 7 comprising the steps of:

receiving said digital television data stream at a decoder and detecting said first identifiers therein; and processing said AMOL data when the first identifier specifying said count of AMOL data indicates the presence of such data.

14. A method in accordance with claim 7 wherein:

prior to communicating said digital television data stream to said receiver, second identifiers are provided in said video syntax, said second identifiers designating a priority of the particular type of user information specified by said first identifiers;

wherein said priority corresponds to a hardware capability level for processing the particular type of user information.

15. A method in accordance with claim 14 wherein the decoding of said user information comprises the further steps of:

detecting said second identifiers in the received data stream; and inhibiting the processing of particular user information if the priority thereof identified by the corresponding second identifier is not a priority supported by the decoder.

16. A method in accordance with claim 8 comprising the further steps of:

providing second identifiers for the extracted user information, said second identifiers designating a priority of the particular type of user information specified by said first identifiers;

wherein said priority corresponds to a hardware capability level for processing the particular type of user information;

providing third and fourth identifiers for said non-realtime video data, said third identifiers designating a sequence number and said fourth identifiers designating segment numbers for said non-realtime video portions; and providing fifth and sixth identifiers for said AMOL data, said fifth identifiers designating whether the AMOL data is null data represented in an abbreviated form and said sixth identifiers designated parity values for said AMOL data.

17. Receiver apparatus for decoding user information contained in digital television signals, comprising:

means for detecting information from a video syntax carried by a video blanking portion of a received digital television signal by identifying at least one of:

(a) a count of closed caption data which is associated with the information according to a relative position of the count in the video syntax; and (b) a count of non-realtime video data which is associated with the information according to a relative position of the count in the video syntax;

means responsive to said detecting means for processing said closed caption data when said count of closed caption data indicates the presence of such data in said vertical blanking portion; and means responsive to said detecting means for processing said non-realtime video data when said count of non-realtime video data indicates the presence of such data in said vertical blanking portion.

18. Receiver apparatus in accordance with claim 17 further comprising:

means for detecting information in said video syntax identifying at least one of a count of sampled video data and a count of AMOL data;

means responsive to said detecting means for processing said sampled video data when said count of sampled video data indicates the presence of such data in said vertical blanking portion; and means responsive to said detecting means for processing said AMOL data when said count of AMOL data indicates the presence of such data in said vertical blanking portion.

19. Receiver apparatus in accordance with claim 17 wherein each of said processing means comprise:

means for detecting information identifying a priority of the received data;

said priority corresponding to a hardware capability level for processing the user information; and means responsive to said means for detecting information identifying said priority for inhibiting the processing of the data if said identified priority is not supported by the receiver apparatus.

20. Receiver apparatus in accordance with claim 17 wherein said received digital television signal has an MPEG format.

21. Apparatus for communicating user information in a bandwidth efficient manner in a digital television data stream, comprising:

means for extracting user information from portions of digital video data that correspond to vertical blanking intervals of successive video frames;

means for quantifying at least one particular type of user information extracted by said extracting means and associating a first identifier therewith, said first identifier specifying a count of the particular type of user information following the identifier; and means for combining the extracted user information including the first identifiers associated therewith with active video portions of said digital video data to form said digital television data stream such that each type of said user information can be identified by a relative position of said first identifiers in the data stream;

wherein said first identifiers enable the adjustment of said data stream to accommodate variable amounts and types of user information without space being reserved for said user information in advance.

22. Apparatus in accordance with claim 21 further comprising:

means for associating second identifiers with the extracted user information, said second identifiers designating a priority of the particular type of user information specified by said first identifiers; wherein:

said priority corresponds to a hardware capability level for processing the user information.

23. Apparatus in accordance with claim 22 wherein each of said second identifiers is inserted into said data stream following a counterpart first identifier.

24. Apparatus in accordance with claim 21 wherein said means for quantifying and associating provides a first identifier specifying a count for closed caption data and a first identifier specifying a count for non-realtime video data.

25. Apparatus in accordance with claim 24 wherein said means for quantifying and associating further provides a first identifier specifying a count for sampled video data and a first identifier specifying a count for AMOL data.

*26. A bandwidth efficient method for processing an input video signal carrying user information to provide a corresponding digital output television signal with compressed pictures for transmission to a receiver, comprising the steps of:*

*(a) extracting at least a first type of user information from the vertical blanking intervals (VBIs) of at least one picture of the input video signal that is used to produce one of the compressed pictures;*

*(b) counting a number of constructs of the extracted first type of user information that are to be provided in the corresponding compressed picture;*

*(c) responsive to said step (b), providing a count syntax element for a video syntax for said output television signal that designates the number of the constructs for the corresponding compressed picture;*

*(d) compressing an active video portion of the input video signal to provide the compressed pictures;*

*(e) providing the constructs in the video syntax after the associated count syntax element for the corresponding compressed picture such that the constructs are correlated with the associated first type of user information based on a position of the constructs in the video syntax; and*

*(f) combining the compressed pictures with the corresponding video syntax to provide the output television signal; wherein:*

*the count syntax element allows the corresponding constructs to be carried in the video syntax without requiring space to be reserved in advance for a specific number of constructs per compressed picture.*

*27. The method of claim 26, wherein:*

*the count syntax element is variable to designate a variable number of constructs in different compressed pictures.*

*28. The method of claim 26, wherein:*

*each of the constructs comprises at least one byte.*

*29. The method of claim 26, wherein:*

*each of the constructs comprises at least one closed caption character.*

*30. The method of claim 26, wherein:*

*the count syntax element designates when a zero number of constructs are provided in the corresponding compressed picture.*

*31. A bandwidth efficient apparatus for processing an input video signal carrying user information to provide a corresponding digital output television signal with compressed pictures for transmission to a receiver, comprising:*

*means for extracting at least a first type of user information for the vertical blanking intervals (VBIs) of at least*

*one picture of the input video signal that is used to produce one of the compressed pictures;*

*means for counting a number of constructs of the extracted first type of user information that are to be provided in the corresponding compressed picture;*

*means, responsive to said counting means, for providing a count syntax element for a video syntax for said output television signal that designates the number of the constructs for the corresponding compressed picture;*

*means for compressing an active video portion of the input video signal to provide the compressed pictures;*

*means for providing the constructs in the video syntax after the associated count syntax element for the corresponding compressed picture such that the constructs are correlated with the associated first type of user information based on a position of the constructs in the video syntax; and*

*means for combining the compressed pictures with the corresponding video syntax to provide the output television signal; wherein:*

*the count syntax element allows the corresponding constructs to be carried in the video syntax without requiring space to be reserved in advance for a specific number of constructs per compressed picture.*

*32. The apparatus of claim 31, wherein:*

*the count syntax element is variable to designate a variable number of constructs in different compressed pictures.*

*33. The apparatus of claim 31, wherein:*

*each of the constructs comprises at least one byte.*

*34. The apparatus of claim 31, wherein:*

*each of the constructs comprises at least one closed caption character.*

*35. The apparatus of claim 31, wherein:*

*the count syntax element designates when a zero number of constructs are provided in the corresponding compressed picture.*

*36. A method for decoding user information carried in a received digital television signal, comprising the steps of:*

*(a) detecting a count syntax element for at least a first type of user information from a video syntax in at least one video blanking portion of a compressed picture in the received digital television signal;*

*(b) determining a number of constructs of the first type of user information for the corresponding compressed picture in accordance with the detected count syntax element;*

*wherein the constructs are provided in the video syntax after the associated count syntax element for the corresponding compressed picture;*

*(c) recovering the constructs from the video syntax in response to said step (b); and*

*(d) correlating the constructs with the first type of user information based on a position of the constructs in the video syntax; wherein:*

*the count syntax element allows the corresponding constructs to be carried in the video syntax without requiring space to be reserved in advance for a specific number of constructs per compressed picture.*

*37. The method of claim 36, wherein:*

*the count syntax element is variable to designate a variable number of constructs in different compressed pictures.*

*38. The method of claim 36, wherein:*

*each of the constructs comprises at least one byte.*

*39. The method of claim 36, wherein:*

*each of the constructs comprises at least one closed caption character.*

*40. The method of claim 36, wherein:*

*the count syntax element designates when a zero number of constructs are provided in the corresponding compressed picture.*

*41. An apparatus for decoding user information carried in a received digital television signal, comprising:*

*means for detecting a count syntax element for at least a first type of user information from a video syntax in at least one video blanking portion of a compressed picture in the received digital television signal;*

*means for determining a number of constructs of the first type of user information for the corresponding compressed picture in accordance with the detected count syntax element;*

*wherein the constructs are provided in the video syntax after the associated count syntax element for the corresponding compressed picture;*

*means, responsive to said determining means, for recovering the constructs from the video syntax; and*

*means for correlating the constructs with the first type of user information based on a position of the constructs in the video syntax; wherein:*

*the count syntax element allows the corresponding constructs to be carried in the video syntax without requiring space to be reserved in advance for a specific number of constructs per compressed picture.*

*42. The apparatus of claim 41, wherein:*

*the count syntax element is variable to designate a variable number of constructs in different pictures.*

*43. The apparatus of claim 41, wherein:*

*each of the constructs comprises at least one byte.*

*44. The apparatus of claim 41, wherein:*

*each of the constructs comprises at least one closed caption character.*

*45. The apparatus of claim 41, wherein:*

*the count syntax element designates when a zero number of constructs are provided in the corresponding compressed picture.*

*46. A bandwidth efficient digital television signal, comprising:*

*at least one compressed picture carrying a video syntax with a count syntax element and associated constructs of at least a first type of user information; wherein:*

*the count syntax element designates a number of the constructs for the corresponding compressed picture;*

*the first type of user information is extracted from vertical blanking intervals (VBIs) of pictures of an input video signal;*

*the count is obtained by counting a number of the constructs of the extracted first type of user information for the corresponding compressed picture;*

*the constructs are provided in the video syntax after the associated count syntax element for the corresponding compressed picture such that the constructs are*

*correlated with the associated first type of user information based on a position of the constructs in the video syntax; and*

*the count syntax element allows the corresponding constructs to be carried in the video syntax without requiring space to be reserved in advance for a specific number of constructs per compressed picture.*

* * * * *